(12) United States Patent  (10) Patent No.: US 9,237,216 B2
Roberts et al.  (45) Date of Patent: Jan. 12, 2016

(54) TECHNIQUES FOR WIRELESSLY DOCKING TO A DEVICE

(71) Applicant: Intel Corporation, Santa Clara, CA (US)

(72) Inventors: Richard D. Roberts, Hillsboro, OR (US); Mathys C. Walma, Hillsboro, OR (US); Carlos Cordeiro, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 150 days.

(21) Appl. No.: 13/794,647

(22) Filed: Mar. 11, 2013

(65) Prior Publication Data

US 2014/0253295 A1  Sep. 11, 2014

(51) Int. Cl.
*H04Q 5/22* (2006.01)
*H04M 1/725* (2006.01)
*H04B 5/00* (2006.01)
*H04B 7/00* (2006.01)
*H04J 1/16* (2006.01)
*H04L 12/28* (2006.01)
*G08C 17/00* (2006.01)
*H04L 29/06* (2006.01)
*G06F 13/00* (2006.01)

(52) U.S. Cl.
CPC ........ *H04M 1/7253* (2013.01); *H04M 2250/04* (2013.01)

(58) Field of Classification Search
USPC ............. 340/10.5, 10.1, 10.6; 455/41.2, 41.1
See application file for complete search history.

(56) References Cited

U.S. PATENT DOCUMENTS

| | | | |
|---|---|---|---|
| 2007/0171910 A1* | 7/2007 | Kumar | H04L 63/0428 370/392 |
| 2007/0232357 A1 | 10/2007 | Takasu | |
| 2010/0203833 A1 | 8/2010 | Dorsey | |
| 2010/0332822 A1* | 12/2010 | Liu | H04W 12/04 713/151 |
| 2011/0283334 A1 | 11/2011 | Choi et al. | |
| 2012/0155443 A1 | 6/2012 | Cordeiro | |
| 2012/0196542 A1 | 8/2012 | Rofougaran | |
| 2012/0303851 A1* | 11/2012 | Tseng | G01C 21/265 710/303 |
| 2013/0154851 A1* | 6/2013 | Gaskill | A61N 1/37282 340/870.02 |
| 2013/0163440 A1* | 6/2013 | Issakov | G01S 5/0221 370/246 |
| 2013/0266136 A1* | 10/2013 | Chu | H04K 1/003 380/34 |
| 2013/0301497 A1* | 11/2013 | Gonikberg | H04W 4/008 370/311 |
| 2014/0187257 A1* | 7/2014 | Emadzadeh | G01S 5/0242 455/456.1 |
| 2014/0244013 A1* | 8/2014 | Reilly | G06F 3/165 700/94 |

(Continued)

OTHER PUBLICATIONS

International Search Report and Written Opinion received for PCT Patent Application No. PCT/US2014/022959, mailed Aug. 25, 2014, 14 pages.

(Continued)

*Primary Examiner* — Jack K Wang
(74) *Attorney, Agent, or Firm* — Kacvinsky Daisak Bluni PLLC

(57) ABSTRACT

Examples are disclosed for a mobile device to wirelessly dock to a device. In some examples, a mobile device may receive an indication to identify a device for wirelessly docking. The mobile device may gather identification for possible devices to wirelessly dock. A ranging technique may be implemented using a given frequency band to identify a device within a shortest distance from the mobile device from among the possible devices. The device having the shortest distance may be selected and a wireless dock may then be established. Other examples are described and claimed.

27 Claims, 10 Drawing Sheets

(56) References Cited

U.S. PATENT DOCUMENTS

2014/0259136 A1* 9/2014 Levy ............... H04L 63/0876
  726/7
2014/0301575 A1* 10/2014 Holtman ............ H04R 3/12
  381/119

OTHER PUBLICATIONS

"IEEE P802.11ad/D9.0 Draft Standard for Information Technology Telecommunications and Information Exchange Between Systems—Local and Metropolitan Area Networks—Specific Requirements", Jul. 2012, 685 pages (Author unknown).

"IEEE Standard for Information Technology Telecommunications and Information Exchange Between Systems—Local and Metropolitan Area Networks—Specific Requirements, Part 15.3: Wireless Medium Access Control (Mac) and Physical Layer (PHY) Specifications for High Rate Wireless Personal Area Networks (WPANs)", Oct. 2009, (Author Unknown).

* cited by examiner

Storage Medium 600

*Computer Executable Instructions for 500*

802
RECEIVE, AT A DEVICE CAPABLE OF WIRELESSLY DOCKING VIA A GIVEN FREQUENCY BAND WITH A MOBILE DEVICE, A REQUEST FROM THE MOBILE DEVICE FOR IDENTIFICATION INFORMATION AND TO CAUSE THE DEVICE TO TRANSMIT IDENTIFICATION INFORMATION FOR THE DEVICE

804
RECEIVE ONE OR MORE PROBE REQUEST MESSAGES FROM THE MOBILE DEVICE VIA THE GIVEN FREQUENCY BAND AND TO CAUSE THE DEVICE TO TRANSMIT, VIA THE GIVEN FREQUENCY BAND, ONE OR MORE SEPARATE PROBE RESPONSES TO EACH OF THE ONE OR MORE PROBE REQUESTS, THE ONE OR MORE SEPARATE PROBE RESPONSES TO INCLUDE INFORMATION FOR THE MOBILE DEVICE TO GAUGE A DISTANCE BETWEEN THE DEVICE AND THE MOBILE DEVICE

806
RECEIVE AN INDICATOR REQUEST MESSAGE TO PROVIDE AN INDICATION FOR ENABLING A SELECTION OF THE DEVICE FOR WIRELESS DOCKING AND CAUSE THE INDICATION TO FACILITATE THE SELECTION

808
WIRELESSLY DOCK TO THE MOBILE DEVICE BASED ON SELECTION OF THE DEVICE FOR WIRELESS DOCKING

*FIG. 8*

Storage Medium 900

*Computer Executable Instructions for 800*

*FIG. 9*

TECHNIQUES FOR WIRELESSLY DOCKING TO A DEVICE

TECHNICAL FIELD

Examples described herein are generally related to a mobile device wirelessly docking to a device.

BACKGROUND

Computing devices having wireless capabilities may communicatively couple to other devices having wireless capabilities via a wireless local area network (WLAN) using wireless technologies such as Wi-Fi™. Also, wireless technologies designed to operate in a 60 GHz communication band such as WiGig™ may allow wireless capable devices to replace wired interconnects with high speed and relatively short range wireless interconnects via a process typically referred to as wireless docking. The high speed and relatively short range wireless interconnects using wireless technologies such as WiGig may allow wireless devices to wirelessly dock with devices having one or more input/output devices such as a display, a keyboard, a network interface card, a mouse or a storage device. In some examples, once wirelessly docked, the wireless device may utilize the one or more input/output devices in a same manner as when connected to a wired or physical docking station.

BRIEF DESCRIPTION OF THE DRAWINGS

FIG. 6 illustrates an example of a first storage medium.
FIG. 8 illustrates an example of a second logic flow.
FIG. 9 illustrates an example of a second storage medium.

DETAILED DESCRIPTION

Figure 1:
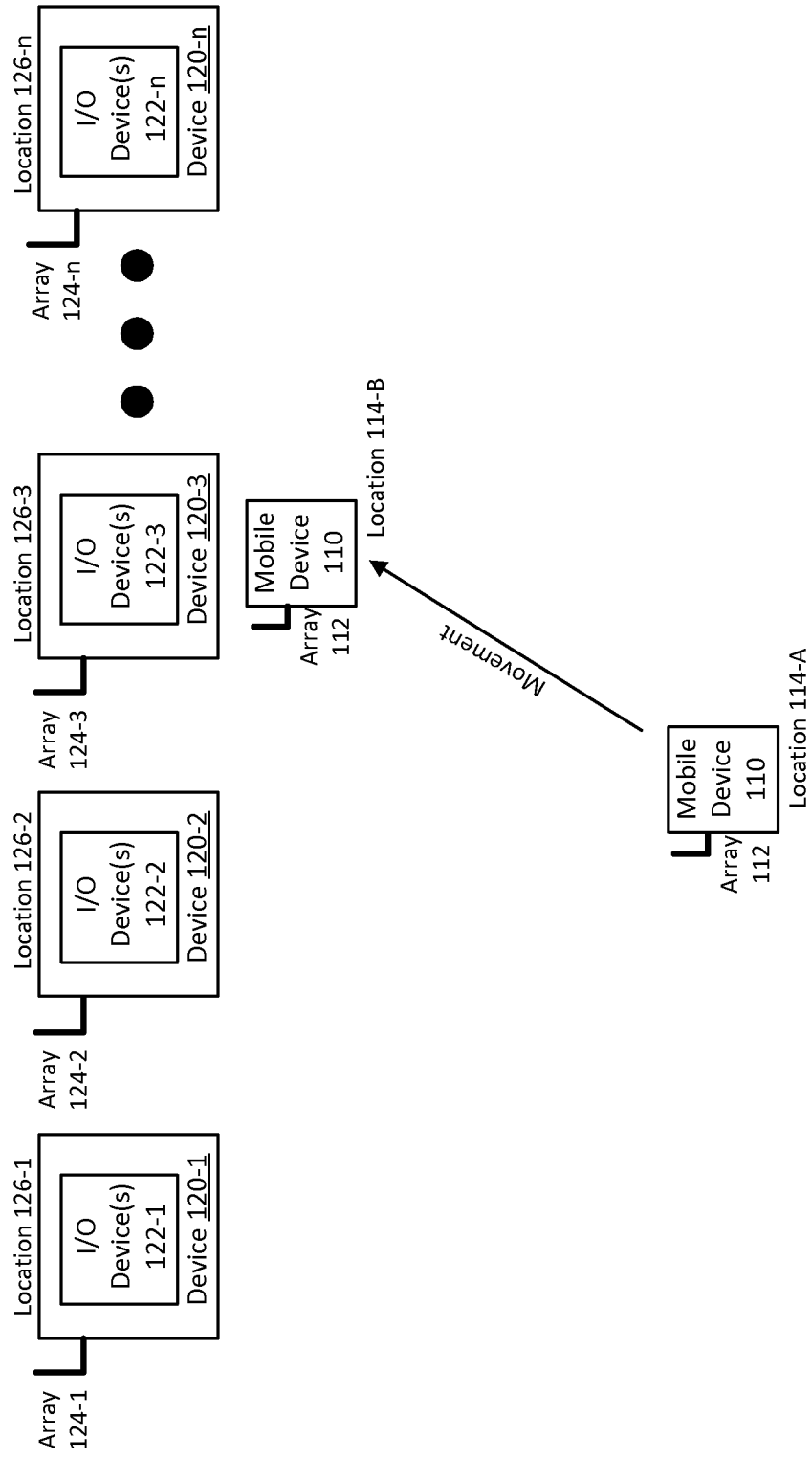
FIG. 1 illustrates an example of a system.

Examples are generally directed to improvements for wireless and/or mobile devices to wirelessly couple or wirelessly dock using wireless technologies associated with Wi-Fi or WiGig. These wireless technologies may include establishing and/or maintaining wireless communication links through various frequency bands to include Wi-Fi and/or WiGig frequency bands, e.g., 2.4, 5 or 60 GHz. These wireless technologies may also include wireless technologies suitable for use with mobile devices or user equipment (UE) capable of coupling to other devices via a WLAN or via a peer-to-peer (P2P) wireless connection. For example, mobile devices and the other device may be configured to operate in compliance with various standards promulgated by the Institute of Electrical and Electronic Engineers (IEEE). These standards may include Ethernet wireless standards (including progenies and variants) associated with the IEEE Standard for Information technology—Telecommunications and information exchange between systems—Local and metropolitan area networks—Specific requirements Part 11: WLAN Media Access Controller (MAC) and Physical Layer (PHY) Specifications, published March 2012, and/or later versions of this standard ("IEEE 802.11").

In some examples various IEEE standards associated with IEEE 802.11 such as IEEE 802.11a/g, IEEE 802.11ac or IEEE 802.11ad may be utilized by mobile devices or other devices to establish or maintain WLAN and/or P2P communication links and/or establish wireless communications with each other (e.g., wireless docking). These other devices may have one or more input/output devices to possibly be used by mobile devices upon wirelessly docking. The other devices may include wireless docking capabilities and may include, but are not limited to, a docking device, a smart phone, a smart television, smart audio speakers, a notebook computer, a tablet computer, an ultrabook computer, a netbook computer, desktop computer, a workstation computer, a server, a handheld gaming device, a gaming console, a handheld media player or a media player console. The one or more input/output devices may either be integrated with the other devices or may be coupled via one or more wired and/or wireless connections.

According to some examples, a user of a mobile device may desire to use input/output devices coupled to one or more devices available for public access via an ad-hoc type deployment. For this type of deployment, the user may at least temporarily want to use input/output devices such as monitors or keyboards to improve productivity and user experience. For example, the user's mobile device may be a smartphone with a relatively small display and a large display may improve work efficiency on a productivity application such as a spreadsheet application. For these examples, some techniques have been proposed that use wireless technologies such as near field communications. Use of NFC technologies may require the user to hold the mobile device near an NFC tag for the device to select a device for wireless docking. NFC technologies may be problematic in that some mobile devices may lack NFC capabilities and the mobile device needs to be placed relatively close (e.g., a few inches or centimeters) to the device to establish an NFC link. It is with respect to these and other challenges that the examples described herein are needed.

According to some examples, an indication may be received at a mobile device to identify a given device to wirelessly dock via a given frequency band (e.g., 60 GHz). For these examples, distances between the mobile device and one or more devices capable of wirelessly docking to the mobile device may be determined utilizing the given frequency band. The given device may then be identified from among the one or more devices based on the given device having the shortest determined distance. In some examples, using the given frequency band to both identify the given wireless device and to wirelessly dock may enable the wireless device to efficiently wirelessly dock to the given device without utilizing additional wireless technologies such as NFC.

FIG. 1 illustrates an example system 100. In some examples, as shown in FIG. 1, system 100 includes a mobile device 110 a plurality of devices 120-1 to 120-n, where n equals any positive whole integer greater than 3. Also as shown in FIG. 1, mobile device 110 includes an array 112 that may include one or more antennas capable of transmitting or receiving communication signals via a given frequency band such as a 60 GHz frequency band or other type of millimeter wave (mmWave) frequency band. Also, in some examples, devices 120-1 to 120-n may include arrays 124-1 to 124-n, respectively as shown in FIG. 1. Arrays 124-1 to 124-n may separately include one or more antennas capable of transmitting or receiving communication signals via the given frequency band. Devices 120-1 to 120-n may also separately include one or more input/output (I/O) devices 122-1 to 122- n, respectively, as shown in FIG. 1. These I/O devices may include, but are not limited to a display, a keyboard, a mouse, and a storage device, a network interface card connected to the internet or one or more audio speakers.

In some examples, mobile device 110 and devices 120-1 to 120-n may be arranged to operate according to the one or more wireless network technologies associated with IEEE 802.11 such as IEEE 802.11ad and/or WiGig. Although not shown in FIG. 1, mobile device 110 and devices 120-1 to 120-n may each include logic and/or features (e.g., chipsets, processor circuits, memory, protocol stacks, etc.) to operate according to IEEE 802.11ad and/or WiGig to transmit or receive communication signals via a 60 GHz frequency band used as described in the IEEE 802.11ad standard.

According to some examples, mobile device 110 may include logic and/or features to receive an indication to identify a given device from among devices 120-1 to 120-n to wirelessly dock via the given frequency band. For these examples, the indication may be received at location 114-a. The indication may be received based on a user of mobile device 110 coming within a physical proximity of devices 120-1 to 120-n. Either the user manually causes the indication or mobile device 110 may be capable of automatically initiating the indication based on coming within range of the given frequency band transmitted from one or more of devices 120-1 to 120-n. This disclosure is not limited to these methods of indication.

In some examples, based on receiving the indication, the logic and/or features of mobile device 110 may gather identification information from devices 120-1 to 120-n. For these examples, the information may be gathered from those devices from among devices 120-1 to 120-n that may be capable of wirelessly docking to mobile device 110. This capability may be based on whether a given device is available for wireless docking (not being used by another mobile device) or is within close enough range of mobile device 110 to establish a wireless dock with mobile device 110.

According to some examples, responsive to an identification request message from mobile device 110, one or more devices from among devices 120-1 to 120-n may transmit identification information to mobile device 110. Logic and/or features at mobile device 110 may then gather this received identification information. The identification information may include, for example, separate media access control (MAC) addresses for the one or more devices that responded to the identification request message.

In some examples, logic and/or features of mobile device 110 may be capable of determining distance(s) to the one or more devices from among devices 120-1 to 120-n that responded to the identification request. For these examples and as described more below, a ranging technique utilizing a frequency band such as the 60 GHz frequency band may be used to determine or gauge distances between mobile device 110 and the one or more devices. For example, distances may be gauged to indicate a distance at either location 114-A or, following movement, at location 114-B as shown in FIG. 1.

According to some examples, logic and/or features of mobile device 110 may be capable of identifying the given device from among devices 120-1 to 120-n that has the shortest indicated distance. For some examples, this identification may occur following a determination that mobile device 110 has stopped moving and thus may have been located at or near the given device by the user of mobile device 110. For example, as shown in FIG. 1, mobile device 110 is closest to device 120-3 at location 114-B. For these examples, the logic and/or features may cause an indication request to be transmitted to device 120-3 to cause the device 120-3 to provide an indication for a selection of device 120-3 for wirelessly docking to mobile device 110. The indication may include a visual indication such as a glowing display or glowing lights on a keyboard, mouse or other type of I/O device included in I/O devices 122-3.

In some examples, the user of mobile device 110 may either confirm or reject device 120-3. Based on a confirmation, logic and/or features at mobile device 110 may be capable of at least initiating the process to wirelessly dock to device 120-3. If rejected, the device having a second shortest determined distance (if one exists) may be identified and the same process may be implemented as mentioned above to allow the user to either confirm or reject this second closest device.

According to some examples, devices 120-1 to 120-n may include logic and/or features to facilitate the exchange of information with mobile device 110 to wirelessly dock. For example, the logic and/or features may be capable of receiving identification requests and cause identification information to be transmitted to mobile device 110 in response to the identification request.

In some examples, as described more below, logic and/or features of devices 120-1 to 120-n may also be capable of exchanging information to enable mobile device 110 to gauge distances via use of a given frequency band such as 60 GHz. Also, the logic and/or features at these devices may be capable of providing an indication for enabling a selection of a device from among devices 120-1 to 120-n for wireless docking to mobile device 110. According to some examples, based on selection of the device (e.g., by the user), the logic and/or features at these devices may also be capable of at least initiating the process to wirelessly dock to mobile device 110.

As mentioned previously, a mobile device using the same frequency band to both identify a device to wirelessly dock and to establish a wireless dock, may eliminate the need for both the mobile device and the device to have components to support other wireless technologies such as near field communications or to support multiple frequency bands.

Figure 2:
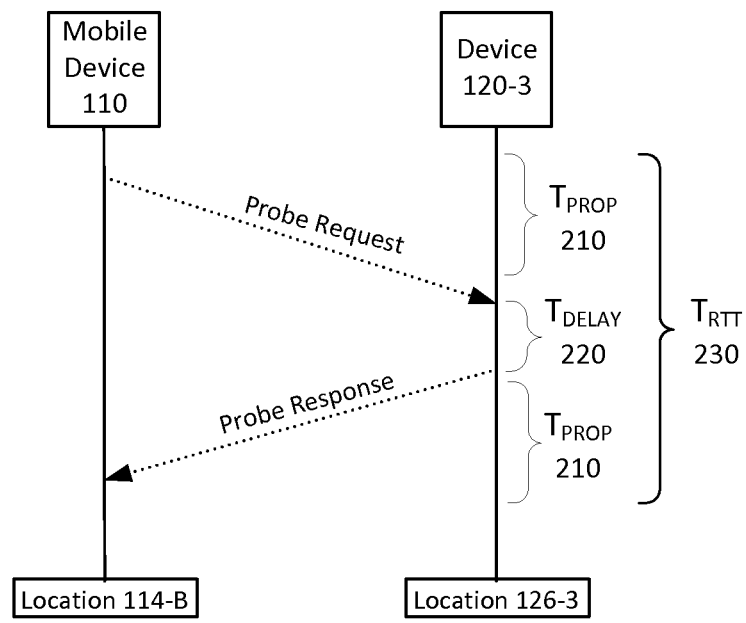
FIG. 2 illustrates an example ranging technique.

FIG. 2 illustrates an example ranging technique 200. According to some examples, ranging technique 200 may be implemented by logic and/or features located at or with a mobile device such as mobile device 110 that may be capable of wirelessly docking to a given device such as device 120-3. For these examples, mobile device 110 may have moved from location 114-A to location 114-B as shown in FIG. 1.

According to some examples, ranging technique 200 may include a two way time of arrival (TW-TOA) technique that utilizes a given frequency band such as the 60 GHz band. As shown in FIG. 2, mobile device 110 may send a probe request to device 120-3 at location 126-3. For these examples, $T_{DELAY}$ 220 may represent a processing delay for device 120-3 to process the received probe request. Processing the received probe request may include the time needed to generate and transmit a probe response to the probe request. According to some examples, device 120-3 may have a predetermined (e.g., vender specific or standard set) value for $T_{DELAY}$ 220 or the value for $T_{DELAY}$ 220 may be variable (e.g., depends on current/available processing capacity).

In some examples, $T_{PROP}$ 210 may be based on signal delay across an air gap between antenna array 112 of mobile device 110 and antenna array 124-3 of device 120-3. For these examples two values for $T_{PROP}$ 210 are shown in FIG. 2 to depict the TW-TOA. Therefore, for the example shown in FIG. 2, a round trip time ($T_{RTT}$) 230 may be determined. This determination of $T_{RTT}$ 230 may be shown by example equation (1) as:

$$T_{RTT} = 2 * T_{PROP} + T_{DELAY} \tag{1}$$

Using equation (1) $T_{PROP}$ may be solved if both $T_{RTT}$ and $T_{DELAY}$ are known as shown by example equation (2):

$$T_{PROP}=(T_{RTT}-T_{DELAY})/2 \qquad (2)$$

According to some examples, logic and/or features at mobile device 110 may be capable of using information in a probe response from device 120-3 to determine $T_{PROP}$ 210. For example, the information may include values for $T_{DELAY}$ 220 and timestamp information. The timestamp information may be compared to timestamp information associated with the probe request to determine $T_{RTT}$ 230. Then using example equation (2) $T_{PROP}$ 210 may be determined. The logic and/or features at mobile device 110 may then use the determined value for $T_{PROP}$ 210 to gauge the distance between mobile device 110 and device 120-3.

In some examples, an IEEE 802.11 compliant message format may be used to transmit probe request or probe response messages. For examples, to transmit probe request messages a Probe Request frame may be used and to transmit a probe response message an ACK frame may be used.

In some examples, other ranging techniques besides ranging technique 200 may be used to determine or gauge a distance between mobile device 110 and device 120-3. These other ranging techniques may be based on relative received signal indicator (RSSI) or other types of time-of-arrival ranging techniques.

Figure 3:
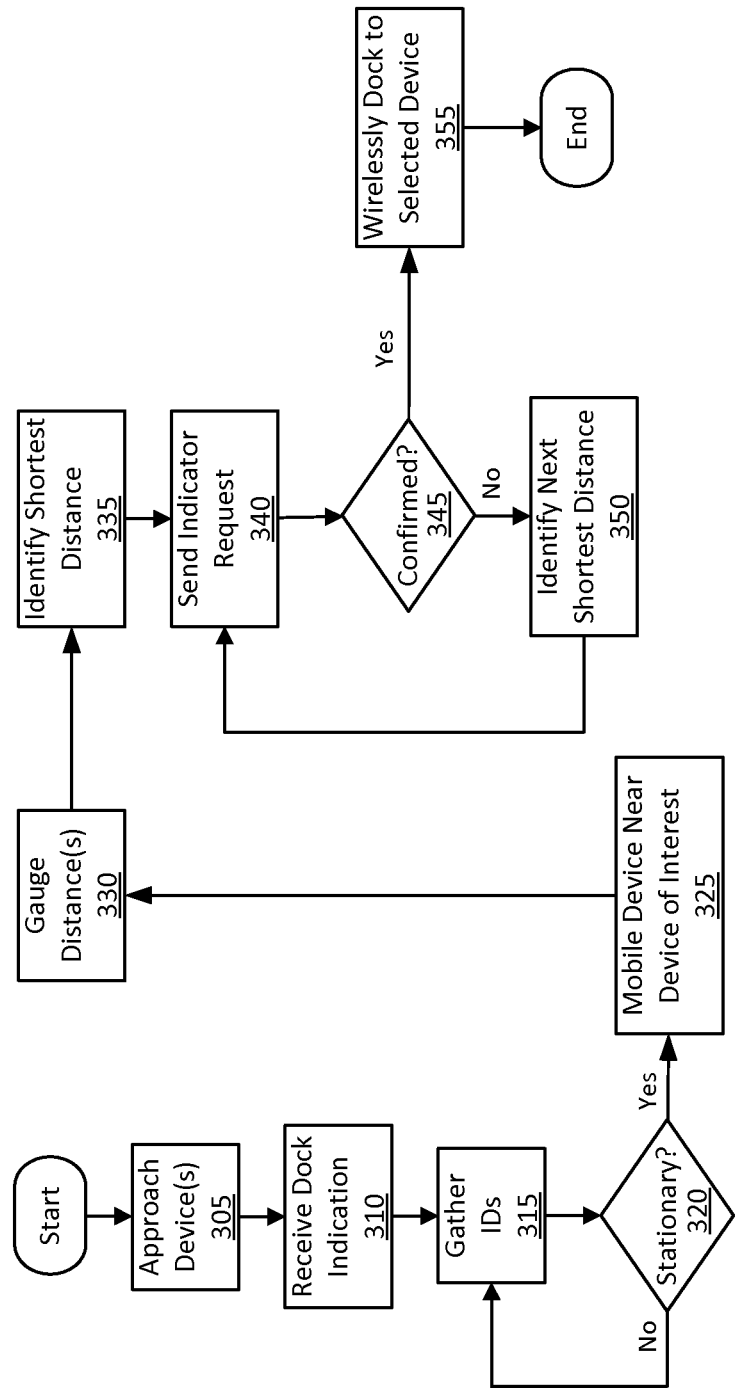
FIG. 3 illustrates an example process.

FIG. 3 illustrates an example process 300. In some examples, elements of system 100, as shown in FIG. 1 may be used to illustrate example operations related to the process flow depicted in FIG. 3. The described example operations are not limited to implementations on system 100 or to the elements describe therein for FIG. 1 or 2.

Moving from the start to block 305 (Approach Device(s)), mobile device 110 may approach devices capable of wirelessly coupling to mobile device 110. In some examples, the devices may include devices 120-1 to 120-n. For these examples, devices 120-1 to 120-n may be located in an office, public library, hotel lobby, Internet café, airport terminal, convention center or other type of location that may have one or more devices with I/O devices for possible use by a mobile device such as mobile device 110.

Proceeding from block 305 to block 310 (Receive Dock Indication), logic and/or features at mobile device 110 may be capable of receiving a dock indication to identify a given device to wirelessly dock. In some examples, the dock indication may be received via the user manually initiating the dock indication or via mobile device 110 coming within wireless range of one or more devices from among devices 120-1 to 120-n. For these examples, the wireless range may be based on the 60 GHz frequency band as described by the IEEE 802.11 ad standard.

Proceeding from block 310 to block 315 (Gather IDs), logic and/or features at mobile device 110 may gather identification information from the one or more devices from among devices 120-1 to 120-n. According to some examples, mobile device 110 may transmit identification requests and logic and/or features at devices 120-1 to 120-n may be capable of generating responses including identification information that may be received and gathered (e.g., temporarily stored) by the logic and/or features of mobile device 110.

Proceeding from block 315 to decision block 320 (Stationary?), logic and/or features at mobile device 110 may be capable of determining whether mobile device 110 has become stationary for a period of time (e.g., at least 5 seconds). If mobile device 110 is determined to be stationary for the period of time, the process moves to block 325. Otherwise, the process moves to block 315 and identification information continues to be gathered. In some examples, the logic and/or features at mobile device 110 may utilize an accelerometer located at or with mobile device 110 to determine whether mobile device 110 has become stationary. In some other examples, the logic and/or features at mobile device 110 be capable of comparing changes in measured distances (e.g., using ranging technique 200) for any one given device from among devices 120-1 to 120-n. If the measured distance does not change for the period of time, mobile device 110 may be deemed as stationary.

Moving from decision block 320 to block 325 (Mobile Device Near Device of Interest), since mobile device 110 has been deemed as stationary, it may be assumed that mobile device is near the device of interest.

Proceeding from block 325 to block 330 (Gauge Distance(s)), logic and/or features at mobile device 110 may gauge distances between the one or more devices among devices 120-1 to 120-n via which identification information was gathered. According to some examples, ranging technique 200 that utilizes the 60 GHz frequency band may be used to gauge distances.

Proceeding from block 330 to block 335 (Identify Shortest Distance), logic and/or features at mobile device 110 may identify which device from among devices 120-1 to 120-n has the shortest distance. In some examples, as shown in FIG. 1, mobile device 110 at location 114-B has the shortest distance to device 120-3. For these examples, device 120-3 as well as device 120-2 may have provided identification information to mobile device 110. As a result of providing identification information, mobile device 110 may have gauged distances to devices 120-2 and 120-3 using ranging technique 200. From these gauged distances, logic and/or features of mobile device 110 may indicate that the shortest distance is to device 120-3.

Proceeding from block 335 to block 340 (Send Indicator Request), logic and/or features at mobile device 110 may send an indicator request message to the device having the shortest indicated distance to cause the device to provide an indication for a selection of the device for wireless docking. According to some examples, the indicator request message may be transmitted to device 120-3. For these examples, responsive to receiving the request message, logic and/or features at device 120-3 may provide a visual indication so that a user of mobile device 110 may be able to determine if device 120-3 is in a desirable location or I/O device 122-3 includes one or more I/O devices needed or desired by the user.

Proceeding from block 340 to decision block 345 (Confirmed?), logic and/or features at mobile device 110 may determine whether the user of mobile device 110 has confirmed selection of device 120-3 for wireless docking. If the user has confirmed the selection, the process moves to block 355. Otherwise, the process moves to block 350. In some examples, the user may confirm selection via a prompt displayed to the user on mobile device 110 that causes the user to make an input to mobile device 110 to indicate confirmation or rejection of the selection.

Moving from decision block 345 to block 350 (Identify Next Shortest Distance), logic and/or features of mobile device 110 may identify the next shortest distance. According to some examples, device 120-2 may have the next shortest distance. For these examples, mobile device 110 may send an indicator request as mentioned above for block 340.

Moving from decision block 345 to block 355 (Wirelessly Dock to Selected Device), logic and/or features at mobile device 110 may wirelessly dock to whichever device was confirmed by the user. In some examples, the wireless dock may be established using the 60 GHz frequency band as described in the IEEE 802.11ad standard. The process may then come to an end.

Figure 4:
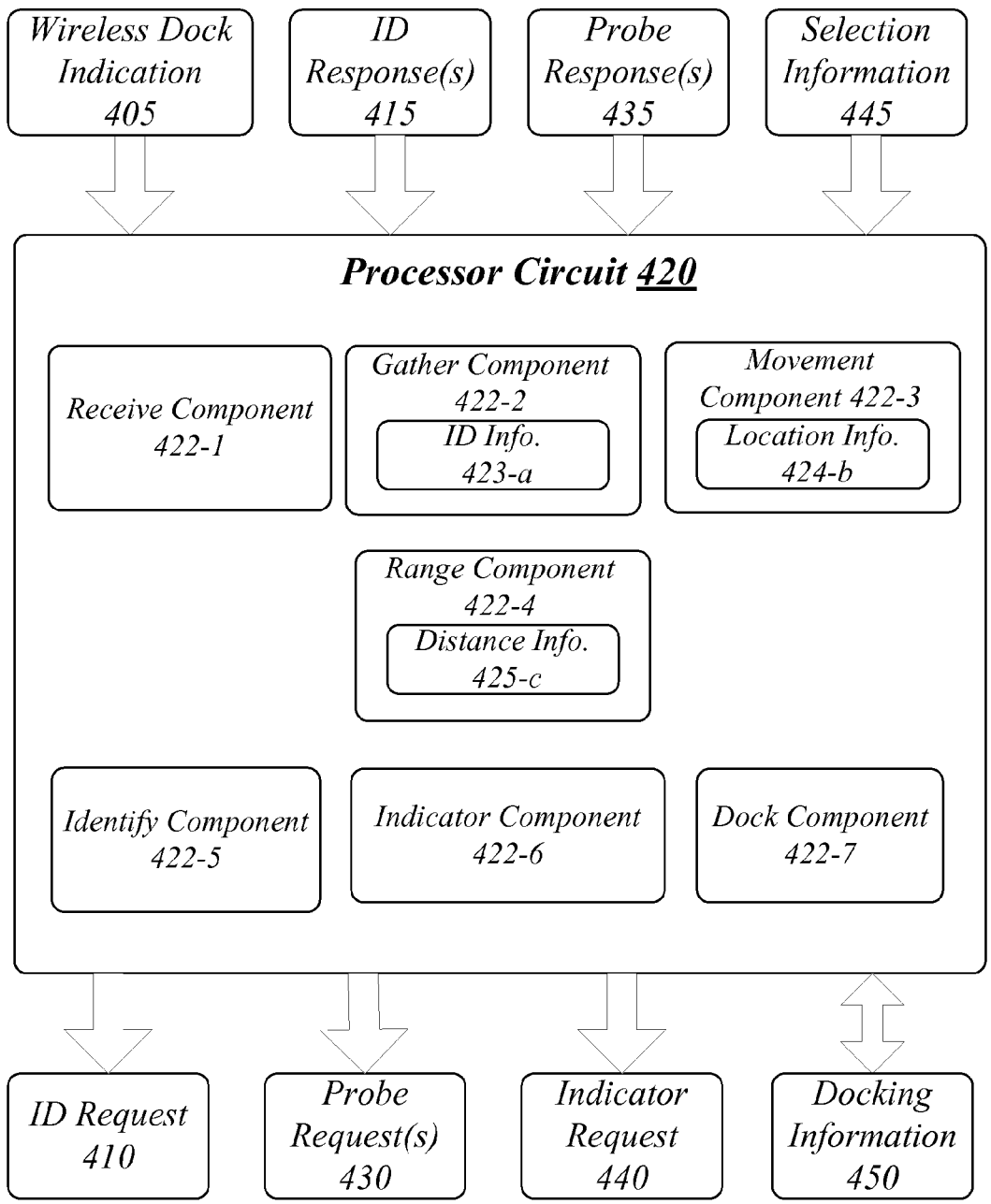
FIG. 4 illustrates an example block diagram for a first apparatus.

FIG. 4 illustrates a block diagram for a first apparatus. As shown in FIG. 4, the first apparatus includes an apparatus 400. Although apparatus 400 shown in FIG. 4 has a limited number of elements in a certain topology or configuration, it may be appreciated that apparatus 400 may include more or less elements in alternate configurations as desired for a given implementation.

The apparatus 400 may comprise a computer and/or firmware implemented apparatus 400 having a processor circuit 420 arranged to execute one or more components 422-*a*. It is worthy to note that "a" and "b" and "c" and similar designators as used herein are intended to be variables representing any positive integer. Thus, for example, if an implementation sets a value for a=7, then a complete set of components 422-*a* may include modules 422-1, 422-2, 422-3, 422-4, 422-5, 422-6 or 422-7. The embodiments are not limited in this context.

According to some examples, apparatus 400 may be part of a mobile device that may be capable of operating in compliance with one or more wireless technologies such as those described in or associated with the IEEE 802.11 standards. For example, the mobile device having apparatus 400 may be arranged or configured to wirelessly couple to a device having one or more I/O devices via a wireless dock established and/or operated according to IEEE 802.11ad. The examples are not limited in this context.

In some examples, as shown in FIG. 4, apparatus 400 includes processor circuit 420. Processor circuit 420 may be generally arranged to execute one or more components 422-*a*. The processor circuit 420 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Qualcomm® Snapdragon®; Intel® Celeron®, Core (2) Duo®, Core i3, Core i5, Core i7, Itanium®, Pentium®, Xeon®, Atom® and XScale® processors; and similar processors. Dual microprocessors, multi-core processors, and other multi-processor architectures may also be employed as processor circuit 420. According to some examples processor circuit 420 may also be an application specific integrated circuit (ASIC) and components 422-*a* may be implemented as hardware elements of the ASIC.

According to some examples, apparatus 400 may include a receive component 422-1. Receive component 422-1 may be executed by processor circuit 420 to receive an indication to identify a given device to wirelessly dock via a given GHz frequency band. For these examples, wireless dock indication 405 may either be received manually from a user of a mobile device having apparatus 400 or based on the mobile device coming within range of the given frequency band for one or more devices that the mobile device may wirelessly dock.

In some examples, apparatus 400 may also include a gather component 422-2. Gather component 422-2 may be executed by processor circuit 420 to gather identification information from one or more devices capable of wirelessly docking to the mobile device. For these examples, responsive to ID request 410, the one or more devices may send ID response(s) 415. Gather component 422-2 may gather identification information included in ID response(s) 415 and at least temporarily store the gathered identification information with ID info. 423-*a*. According to some examples, gather component 422-2 may maintain ID info. 423-*a* in a data structure such as a lookup table (LUT).

According to some examples, apparatus 400 may also include a movement component 422-3. Movement component 422-3 may be executed by processor circuit 420 to detect whether the mobile device has become stationary for a period of time. For these examples, movement component may at least temporarily store information to determine movement in location info. 424-*b*. The movement detection may be based on an accelerometer or based on change of location comparisons over the period of time. In some examples, location info. may be maintained in a LUT or other type of data structure.

In some examples, apparatus 400 may also include a range component 422-4. Range component 422-4 may be executed by processor circuit 420 to gauge distances between the mobile device and the one or more devices based on a ranging technique utilizing the given frequency band. For these examples, a ranging technique such as ranging technique 200 may be used to gauge the distances. Range component 422-4 may cause probe request(s) 430 to be transmitted to the one or more devices and receive corresponding probe response(s) 435. Information associated with transmitted probe request(s) 430 and received probe response(s) 435 may then be used to indicate separate distances between the mobile device and the one or more devices. Range component 422-4 may use identification information from ID Info. 423-*a* and at least temporarily maintain indicated distances with distance info. 425-*c*. According to some examples, distance info. 425-*c* may be maintained in a LUT or other type of data structure.

According to some examples, apparatus 400 may also include an identify component 422-5. Identify component 422-5 may be executed by processor circuit 420 to identify the given device from among the one or more devices based on the given device having the shortest indicated distance.

In some examples, apparatus 400 may also include an indicator component 422-6. Indicator component 422-6 may be executed by processor circuit 420 to cause the given device to provide an indication for a selection of the given device for wireless docking. For these examples, indicator component 422-6 may cause the mobile device to transmit indicator request 440 to the given device. Indicator request 440 may cause the given device to provide the indication for selection (e.g., glowing display or other glowing I/O devices coupled to the given device).

According to some examples, apparatus 400 may also include a dock component 422-7. Dock component 422-7 may be executed by processor circuit 420 to wirelessly dock to the given device based on receiving confirmation of selection of the given wireless device for wireless docking. For these examples, selection information 445 may include an indication that confirms the given device as the device that the user of the mobile device desires to wirelessly dock. Docking information 450 may then be exchanged with the given device via the given frequency band to establish the wireless dock.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

Figure 5:
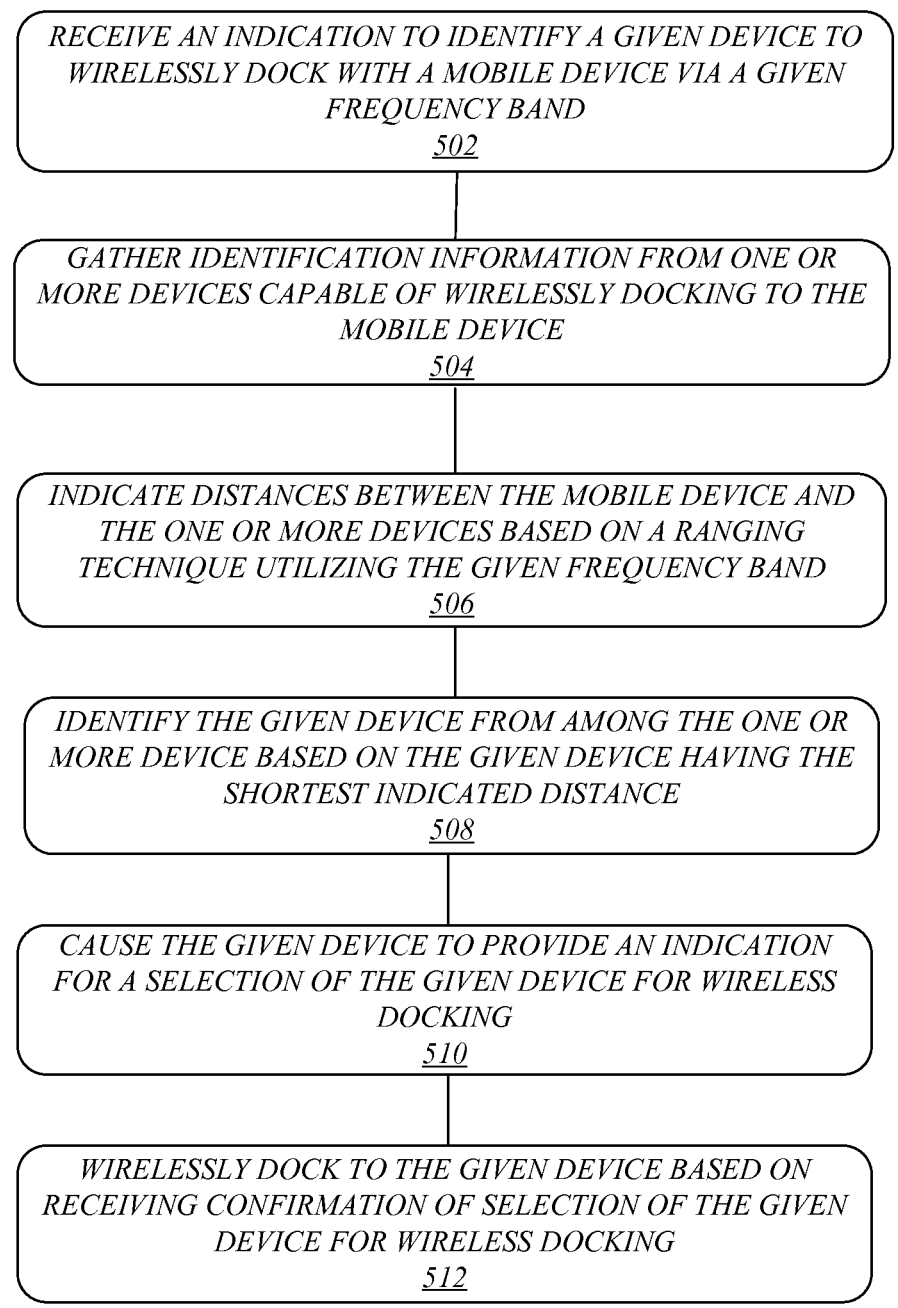
FIG. 5 illustrates an example of a first logic flow.

FIG. 5 illustrates an example of a first logic flow. As shown in FIG. 5, the first logic flow includes a logic flow 500. Logic flow 500 may be representative of some or all of the operations executed by one or more logic, features, or devices described herein, such as apparatus 400. More particularly, logic flow 500 may be implemented by receive component 422-1, gather component 422-2, movement component 422-3, range component 422-4, identify component 422-5, indicator component 422-6 or dock component 422-7.

In the illustrated example shown in FIG. 5, logic flow 500 at block 502 may receive an indication to identify a given device to wirelessly dock with a mobile device via a given frequency band. For these examples, receive component 422-1 may receive wireless dock indication 405 that may have been manually caused by a user of the mobile device that includes apparatus 400 or automatically due to one or more devices coming within range of the mobile device. Also, the mobile device and the one or more devices may be capable of operating in compliance with the IEEE 802.11ad standard to wirelessly communicate via the 60 GHz frequency band.

According to some examples, logic flow 500 at block 504 may gather identification information from one or more devices capable of wirelessly docking to the mobile device. For these examples, the identification information may have been gathered by gather component 422-2 from ID response(s) 415 sent from the one or more devices in response to those devices receiving ID request 410.

In some examples, logic flow 500 at block 506 may indicate distances between the mobile device and the one or more devices based on a ranging technique utilizing the given frequency band. For these examples, range component 422-4 may gauge the distances based on information associated with probe request(s) 430 and probe response(s) 435. The information may be used to implement ranging technique 200 as described above for FIG. 2 to gauge and then indicate the distances.

According to some examples, logic flow 500 at block 508 may identify the given device from among the one or more devices based on the given device having the shortest indicated distance. For these examples, identify component 422-5 may identify the given device based the distances indicated by range component 422-4.

In some examples, logic flow 500 at block 510 may cause the given device to provide an indication for a selection of the given device for wireless docking. For these examples, indicator component 422-6 may cause the mobile device to transmit indicator request 440 to the given device. Responsive to receipt of indicator request 440, the given device may provide the indication.

According to some examples, logic flow 500 at block 512 may wirelessly dock to the given device based on receiving confirmation of selection of the given device for wireless docking. For these examples, dock component 422-7 may exchange docking information 450 with the given device responsive to receiving selection information 445 that may confirm the selection of the given device for wireless docking.

FIG. 6 illustrates an embodiment of a first storage medium. As shown in FIG. 6, the first storage medium includes a storage medium 600. Storage medium 600 may comprise an article of manufacture. In some examples, storage medium 600 may include any non-transitory computer readable medium or machine readable medium, such as an optical, magnetic or semiconductor storage. Storage medium 600 may store various types of computer executable instructions, such as instructions to implement logic flow 500. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 7:
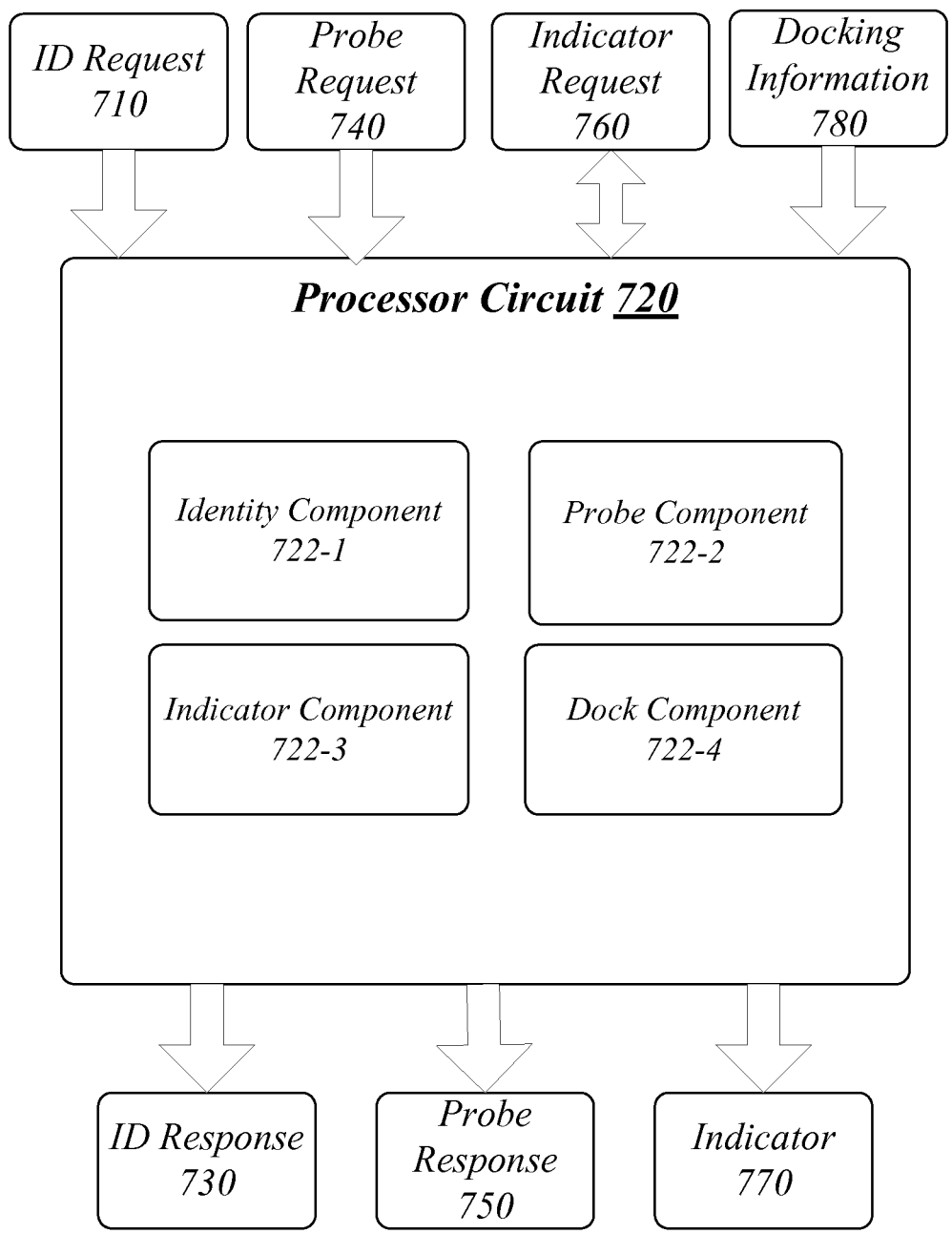
FIG. 7 illustrates an example block diagram for a second apparatus.

FIG. 7 illustrates a block diagram for a second apparatus. As shown in FIG. 7, the second apparatus includes an apparatus 700. Although apparatus 700 shown in FIG. 7 has a limited number of elements in a certain topology or configuration, it may be appreciated that apparatus 700 may include more or less elements in alternate configurations as desired for a given implementation.

The apparatus 700 may comprise a computer-implemented apparatus 700 having a processor circuit 720 arranged to execute one or more components 722-$a$. Similar to apparatus 400 for FIG. 4, "a" and "b" and "c" and similar designators may be variables representing any positive integer.

According to some examples, apparatus 700 may be part of a device having one or more I/O devices. The device may be capable of operating in compliance with one or more wireless technologies such as those described in or associated with the IEEE 802.11 standards. For example, the device having apparatus 700 may be arranged or configured to wirelessly couple to a mobile device via a wireless dock established and/or operated according to IEEE 802.11ad to enable the mobile device to access and/or use the one or more I/O devices. The examples are not limited in this context.

In some examples, as shown in FIG. 7, apparatus 700 includes processor circuit 720. Processor circuit 720 may be generally arranged to execute one or more components 722-$a$. The processor circuit 720 can be any of various commercially available processors to include, but not limited to, those previously mentioned for processing circuit 420 for apparatus 400. Dual microprocessors, multi-core processors, and other multi-processor architectures may also be employed as processor circuit 720. According to some examples processor circuit 720 may also be an application specific integrated circuit (ASIC) and modules 722-$a$ may be implemented as hardware elements of the ASIC.

According to some examples, apparatus 700 may include an identity component 722-1. Identity component 722-1 may be executed by processor circuit 720 to receive a request from a mobile device via a given frequency band (e.g., 60 GHz) for identification information. Responsive to the request, identity component 722-1 may cause a device having an apparatus 700 to transmit identification information for the device. For these examples, the request may be included in ID request 710 and ID response 730 may be transmitted in response. In some examples, ID response 730 may include a MAC address for the device.

In some examples, apparatus 700 may also include a probe component 722-2. Probe component 722-2 may be executed by processor circuit 720 to receive one or more probe request messages from the mobile device via the given GHz frequency band. Responsive to the one or more probe request messages, probe component 722-2 may cause the device to transmit one or more separate probe responses to each of the one or more probe requests via the given GHz frequency band. The one or more separate probe responses may include information for the mobile device to gauge a distance between the device and the mobile device. For these examples, probe component 722-2 may cause the transmission of probe response 750 in response to the device receiving a probe request 740.

According to some examples, apparatus 700 may also include an indicator component 722-3. Indicator component 722-3 may be executed by processor circuit 720 to receive an indicator request message to provide an indication for enabling a selection of the device for wireless docking. Indicator component 722-3 may also cause the indication to facilitate the selection. For these examples, responsive to the device receiving indicator request 760, indicator component 722-3 may cause indicator 770 to facilitate the selection. In some examples, indicator 770 may include one or more visual indications such as a glowing display or keyboard that may be included in the I/O devices coupled to the device to be wirelessly docked to the mobile device.

In some examples, apparatus 700 may also include a dock component 722-4. Dock component 722-4 may be executed by processor circuit 720 to wirelessly dock to the mobile device based on selection of the device for wireless docking. For these examples, dock component 722-4 may exchange docking information 780 with the mobile device via the given frequency band to establish the wireless dock.

Various components of apparatus 700 and a device implementing apparatus 700 may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 8 illustrates an example of a second logic flow. As shown in FIG. 8, the second logic flow includes a logic flow 800. Logic flow 800 may be representative of some or all of the operations executed by one or more logic, features, or devices described herein, such as apparatus 700. More particularly, logic flow 800 may be implemented by identify component 722-1, probe component 722-2, indicator component 722-3 or dock component 722-4.

In the illustrated example shown in FIG. 8, logic flow 800 at block 802 may receive, at device having apparatus 700 capable of wirelessly docking via a given frequency band (e.g., 60 GHz) with a mobile device, a request from the mobile device. The request may be for identification information and may cause the device to transmit identification information for the device. For these examples, identify component 722-1 may receive ID request 710 and cause the device to transmit ID response 730 to the mobile device. ID response 730 may include identification information for the device such as a MAC address or other type of identifier information.

According to some examples, logic flow 800 at block 804 may receive one or more probe request messages from the mobile device via the given frequency band and may cause the device to transmit, via the given frequency band, one or more separate probe responses to each of the one or more probe requests. The one or more separate probe responses may include information for the mobile device to gauge a distance between the device and the mobile device. For these examples, probe component 722-2 may receive probe request 740 and may cause the device to send probe response 750. The information included in probe response 750 may include time stamp information and other information such as $T_{DELAY}$ information. The $T_{DELAY}$ information may be used by the mobile device to implement a ranging technique such as ranging technique 200 to gauge a distance between the device and the mobile device.

According to some examples, logic flow 800 at block 806 may receive an indicator request message to provide an indication for enabling a selection of the device for wireless docking and cause the indication to facilitate the selection. For these examples, indicator component 722-3 may receive indicator request 760 and may then cause indicator 770 to be provided by the device to facilitate the selection.

In some examples, logic flow 800 at block 808 may wirelessly dock to the mobile device based on selection of the device for wireless docking. For these examples, dock component 722-4 may exchange docking information 780 with the mobile device via the given frequency band to establish the wireless dock. The user of the mobile device may have selected the device based on indicator 770 providing the user an indication that the device was the desired device for wireless docking. For example, a display included in one or more I/O device coupled to the device was of a desirable size and was acceptably located for use by the user of the mobile device.

FIG. 9 illustrates an embodiment of a first storage medium. As shown in FIG. 9, the first storage medium includes a storage medium 900. Storage medium 900 may comprise an article of manufacture. In some examples, storage medium 900 may include any non-transitory computer readable medium or machine readable medium, such as an optical, magnetic or semiconductor storage. Storage medium 900 may store various types of computer executable instructions, such as instructions to implement logic flow 800. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 10:
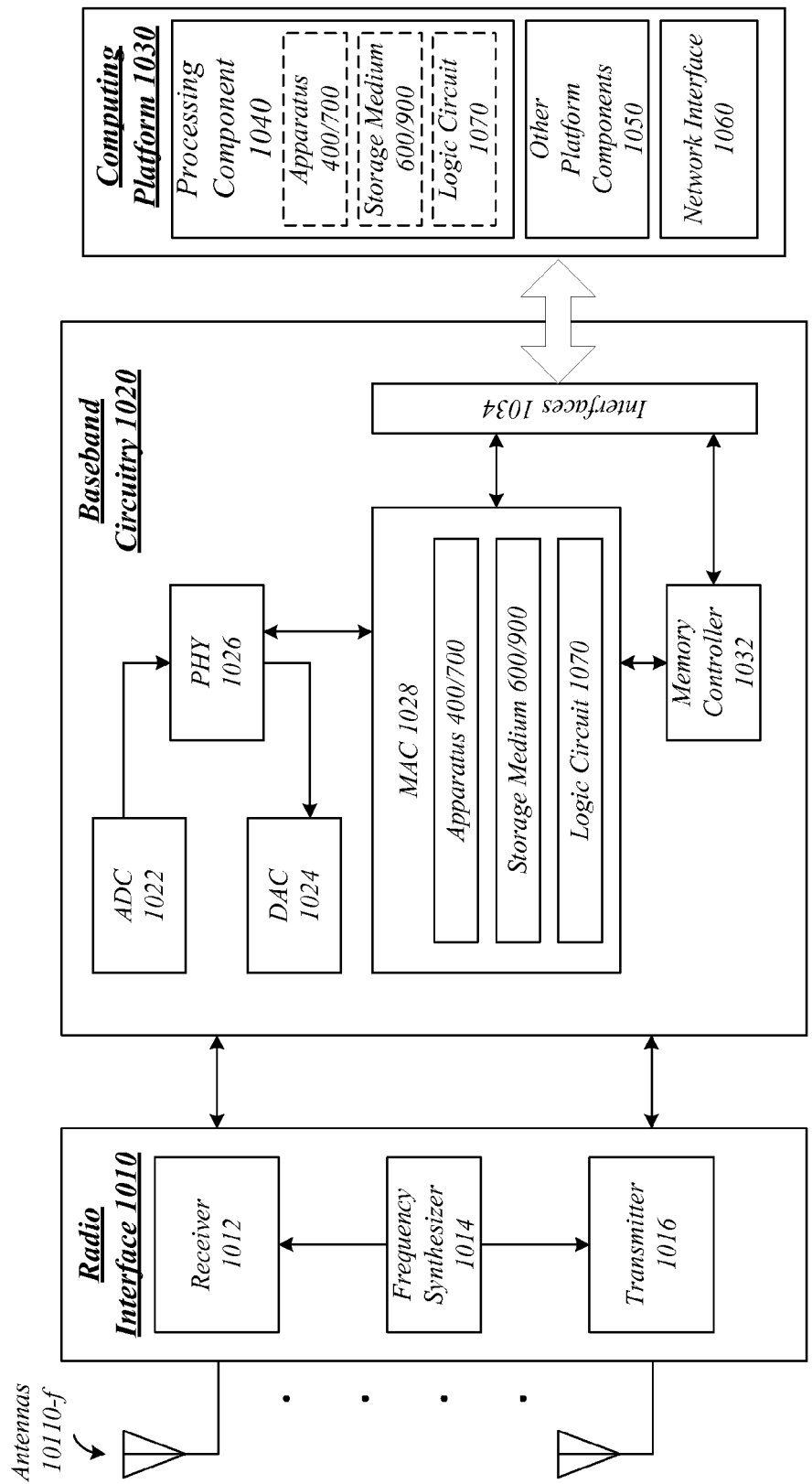
FIG. 10 illustrates an example of a device.

FIG. 10 illustrates an embodiment of a device 1000. In some examples, device 1000 may be configured or arranged for wireless communications in a wireless network. Device 1000 may implement, for example, apparatus 400/700, storage medium 600/900 and/or a logic circuit 1070. The logic circuit 1070 may include physical circuits to perform operations described for apparatus 400/700. As shown in FIG. 10, device 1000 may include a radio interface 1010, baseband circuitry 1020, and computing platform 1030, although examples are not limited to this configuration.

The device 1000 may implement some or all of the structure and/or operations for apparatus 400/700, storage medium 600/900 and/or logic circuit 1070 in a single computing entity, such as entirely within a single device. The embodiments are not limited in this context.

Radio interface 1010 may include a component or combination of components adapted for transmitting and/or receiving single carrier or multi-carrier modulated signals (e.g., including complementary code keying (CCK) and/or orthogonal frequency division multiplexing (OFDM) symbols and/or single carrier frequency division multiplexing (SC-FDM symbols) although the embodiments are not limited to any specific over-the-air interface or modulation scheme. Radio interface 1010 may include, for example, a receiver 1012, a transmitter 1016 and/or a frequency synthesizer 1014. Radio interface 1010 may include bias controls, a crystal oscillator and/or one or more antennas 1018-$f$. In another embodiment, radio interface 1010 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1020 may communicate with radio interface 1010 to process receive and/or transmit signals and may include, for example, an analog-to-digital converter 1022 for down converting received signals, a digital-to-analog converter 1024 for up converting signals for transmission. Further, baseband circuitry 1020 may include a baseband or physical layer (PHY) processing circuit 1026 for PHY link layer processing of respective receive/transmit signals. Baseband circuitry 1020 may include, for example, a processing circuit 1028 for medium access control (MAC)/data link layer processing. Baseband circuitry 1020 may include a memory controller 1032 for communicating with MAC processing circuit 1028 and/or a computing platform 1030, for example, via one or more interfaces 1034.

In some embodiments, PHY processing circuit 1026 may include a frame construction and/or detection module, in combination with additional circuitry such as a buffer memory, to construct and/or deconstruct communication frames (e.g., containing subframes). Alternatively or in addition, MAC processing circuit 1028 may share processing for certain of these functions or perform these processes independent of PHY processing circuit 1026. In some embodiments, MAC and PHY processing may be integrated into a single circuit.

Computing platform 1030 may provide computing functionality for device 1000. As shown, computing platform 1030 may include a processing component 1040. In addition to, or alternatively of, baseband circuitry 1020 of device 1000 may execute processing operations or logic for apparatus 400/700, storage medium 600/900, and logic circuit 1070 using the processing component 1030. Processing component 1040 (and/or PHY 1026 and/or MAC 1028) may comprise various hardware elements, software elements, or a combination of both. Examples of hardware elements may include devices, logic devices, components, processors, microprocessors, circuits, processor circuits (e.g., processor circuit 1020), circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

Computing platform 1030 may further include other platform components 1050. Other platform components 1050 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Computing platform 1030 may further include a network interface 1060. In some examples, network interface 1060 may include logic and/or features to support network interfaces operated in compliance with one or more wireless broadband technologies such as those described in one or more standards associated with IEEE 802.11 such as IEEE 802.11ad.

Device 1000 may be, for example, user equipment, a computer, a personal computer (PC), a desktop computer, a laptop computer, a notebook computer, a netbook computer, a tablet computer, an ultrabook computer, a smart phone, embedded electronics, a gaming console, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of device 1000 described herein, may be included or omitted in various embodiments of device 1000, as suitably desired. In some embodiments, device 1000 may be configured to be compatible with protocols and frequencies associated with IEEE 802.11 Standards for WLANs and/or for wireless docking, although the examples are not limited in this respect.

Embodiments of device 1000 may be implemented using single input single output (SISO) antenna architectures. However, certain implementations may include multiple antennas (e.g., antennas 1018-*f*) for transmission and/or reception using adaptive antenna techniques for beamforming or spatial division multiple access (SDMA) and/or using multiple input multiple output (MIMO) communication techniques.

The components and features of device 1000 may be implemented using any combination of discrete circuitry, application specific integrated circuits (ASICs), logic gates and/or single chip architectures. Further, the features of device 1000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1000 shown in the block diagram of FIG. 10 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

In some examples, an example first apparatus for a mobile device may include a processor circuit. For these examples, a receive component may be executed by the processor circuit to receive an indication to identify a given device to wirelessly dock via a given frequency band to the mobile device. A gather component may also be executed by the processor circuit to gather identification information from one or more devices capable of wirelessly docking to the mobile device. A range component may also be executed by the processor circuit to indicate distances between the mobile device and the one or more devices based on a ranging technique utilizing the given frequency band. An identify component may also be executed by the processor circuit to identify the given device from among the one or more devices based on the given device having a shortest indicated distance.

According to some examples, the example first apparatus may also include an indicator component to be executed by the processor circuit to cause the given device to provide an indication for a selection of the given device for wireless docking. The example first apparatus to also include a docking component to be executed by the processor circuit to wirelessly dock to the given device based on receiving confirmation of selection of the given device for wireless docking.

In some examples, the example first apparatus may also include a movement component to be executed by the processor circuit to detect whether the mobile device has become stationary for a period of time. For these examples, the identify component may indicate the shortest distance to identify the given device following the movement component's determination that the mobile device has become stationary for the period of time.

According to some examples for the example first apparatus, the movement component may use an accelerometer located with the mobile device to detect whether the mobile device has become stationary for the period of time.

In some examples for the example first apparatus, the ranging technique utilizing the 60 GHz frequency band may include the range component capable of transmitting one or more probe request messages to the one or more devices via the given frequency band. The range component may also be capable of receiving one or more separate probe responses that include information to gauge the distances between the mobile device and the one or more devices.

According to some examples for the example first apparatus, the information received in the one or more separate probe responses may be used by the range component to separately determine a round trip time ($T_{RTT}$) based on signal delay across an air gap between an antenna for the mobile device and an antenna for each device from among the one or more devices ($T_{PROP}$) and on a respective processing delay for each device to process a received probe request ($T_{DELAY}$), where the round trip time may be determined by $T_{RTT}=2*T_{PROP}+T_{DELAY}$.

In some examples for the example first apparatus, based on a respective separately determined $T_{RTT}$ by the range component for each of the one or more devices, the range component may separately indicate a respective distance between the mobile device and each of the one or more devices.

According to some examples for the example first apparatus, the one or more devices may have at least one input/out device accessible to the mobile device following wireless docking. The at least one input/out device may include a display, a keyboard, a mouse, a storage device, a network interface card connected to the internet or one or more audio speakers.

In some examples for the example first apparatus, the mobile device and the one or more devices device may be capable of operating in compliance with at least one or more wireless communication standards associated with the IEEE 802.11 standards to include IEEE 802.11ad. For these examples, the given frequency band may be a 60 GHz frequency band.

According to some examples for the example first apparatus, the gather component to gather identification information may include the gather component to receive separate MAC addresses for each of the one or more devices. For these examples, the separate MAC addresses may be sent by the one or more devices in response to a request message caused by the gather component to be transmitted from the mobile device that requested the separate MAC addresses.

In some examples for the example first apparatus, the indication to identify the given device may be received based on the mobile device coming within range of the given frequency band for the one or more devices or a user of the mobile device providing the indication.

In some examples, example first methods implemented at a mobile device may include receiving an indication to identify a given device to wirelessly dock via a given frequency band. The example first methods may also include indicating distances between the mobile device and one or more devices capable of wirelessly docking to the mobile device based on a ranging technique utilizing the given frequency band and identifying the given device from among the one or more devices based on the given device having a shortest indicated distance.

In some examples, the example second methods may also include causing the given device to provide an indication for a selection of the given device for wireless docking and wirelessly docking to the given device based on receiving confirmation of selection of the given device for wireless docking.

According to some examples for the example second methods, the given device may have one or more input/output devices accessible to the mobile device following wireless docking. The device or the one or more input/output devices may provide a visual indication for the selection of the given device for wireless docking.

In some examples for the example second methods, the visual indication may include one of a glowing or pulsing light emitting device associated with the one or more input/output devices or a graphic on a display associated with the one or more input/output devices.

According to some examples for the example second methods, the shortest indicated distance may be indicated following detection that the mobile device has become stationary for a period of time.

In some examples for the example second methods, the detection may be based on the mobile device using an accelerometer to detect whether the mobile device has become stationary for the period of time.

According to some examples for the example second methods, the detection may be based on comparing at least two distance determinations between the mobile device and the given device and detect whether the mobile device has become stationary for the period of time based on the at least two distance determinations indicating substantially the same distance over the period of time.

In some examples for the example second methods, the ranging technique utilizing the given frequency band may include transmitting one or more probe request messages to the one or more devices via the given frequency band. The ranging technique may also include receiving one or more separate probe responses that include information to indicate the distances between the mobile device and the one or more devices.

According to some examples for the example second methods, the ranging technique may also include the information received in the one or more separate probe responses being used to separately determine a round trip time ($T_{RTT}$) based on signal delay across an air gap between an antenna for the mobile device and an antenna for each device from among the one or more devices ($T_{PROP}$) and on a respective processing delay for each device to process a received probe request ($T_{DELAY}$), where the round trip time may be determined by $T_{RTT}=2*T_{PROP}+T_{DELAY}$.

In some examples for the example second methods, based on a respective separately determined $T_{RTT}$ for each of the one or more devices, the ranging technique may also include separately indicating a respective distance between the mobile device and each of the one or more devices.

In some examples for the example second methods, the one or more devices may have at least one input/out device accessible to the mobile device following wireless docking. The at least one input/out device to include a display, a keyboard, a mouse, a storage device, a network interface card connected to the internet or one or more audio speakers.

According to some examples for the example second methods, the mobile device and the one or more devices capable of operating in compliance with at least one or more wireless communication standards associated with the IEEE 802.11 standards to include IEEE 802.11ad. For these examples, the given frequency band may be a 60 GHz frequency band.

In some examples for the example second methods, gathering identification information for one or more devices capable of wirelessly docking to the mobile device via receiving separate MAC addresses for each of the one or more devices. For these examples, the separate MAC addresses may have been sent by the one or more devices in response to a request message sent by the mobile device that requested identification information for devices capable of wirelessly docking to the mobile device.

In some examples, a first at least one machine readable medium may include a plurality of instructions that in response to be being executed on a system for a mobile device may cause the system to receive an indication to identify a given device to wirelessly dock via a given frequency band. The instructions may also cause the system to gather identification information from one or more devices capable of wirelessly docking to the mobile device. The instructions may also cause the system to indicate distances between the mobile device and the one or more devices based on a ranging technique utilizing the given frequency band. The instructions may also cause the system to identify the given device from among the one or more devices based on the given device having a shortest indicated distance.

According to some examples, the first at least one machine readable medium may also cause the system to cause the given device to provide an indication for a selection of the given device for wireless docking and wirelessly dock to the given device based on receiving confirmation of selection of the given device for wireless docking.

According to some examples, the first at least one machine readable medium may also cause the system to transmit one or more probe request messages to the one or more devices via the given frequency band and receive one or more separate probe responses that include information to gauge the distances between the mobile device and the one or more devices.

According some examples for the first at least one machine readable medium, the plurality of instructions to also cause the system to use the information received in the one or more separate probe responses to separately determine a round trip time ($T_{RTT}$) based on signal delay across an air gap between an antenna for the mobile device and an antenna for each device from among the one or more devices ($T_{PROP}$) and on a respective processing delay for each device to process a received probe request ($T_{DELAY}$), where the round trip time may be determined by $T_{RTT}=2*T_{PROP}+T_{DELAY}$.

In some examples for the first at least one machine readable medium, based on a respective separately determined $T_{RTT}$ for each of the one or more devices, the plurality of instructions to also cause the system to separately indicate a respective distance between the mobile device and each of the one or more devices.

According to some examples for the first at least one machine readable medium, the mobile device and the one or more devices may be configured to operate in compliance with at least one or more wireless communication standards associated with the IEEE 802.11 standards to include IEEE 802.1 lad. For these examples, the given frequency band may be a 60 GHz frequency band.

In some examples, an example second apparatus for a mobile device may include means for receiving an indication to identify a given device to wirelessly dock via a given frequency band to the mobile device. The example second apparatus may also include means for indicating distances between the mobile device and one or more devices capable of wirelessly docking to the mobile device based on a ranging technique utilizing the given frequency band. The example second apparatus may also include and means for identifying the given device from among the one or more devices based on the given device having a shortest indicated distance.

According to some examples, the example second apparatus may also include means for causing the given device to provide an indication for a selection of the given device for wireless docking and wirelessly docking to the given device based on receiving confirmation of selection of the given device for wireless docking.

In some examples, the example second apparatus may also include means for indicating the shortest indicated distance following detection that the mobile device has become stationary for a period of time.

According to some examples, the example second apparatus may also include means for detecting when the mobile device has become stationary for a period of time includes use of an accelerometer located with the mobile device.

In some examples, an example third apparatus for a device capable of wirelessly docking to a mobile device via a given frequency band may include a processor circuit. For these examples, an identity component may be executed by the processor circuit to receive a request from the mobile device for identification information and to cause the device to transmit identification information for the device. A probe component may also be executed by the processor circuit to receive one or more probe request messages from the mobile device via the given frequency band and to cause the device to transmit, via the given frequency band, one or more separate probe responses to each of the one or more probe requests. The one or more separate probe responses may include information for the mobile device to gauge a distance between the device and the mobile device.

According to some examples for the example third apparatus, an indicator component may also be executed by the processor circuit to receive an indicator request message to provide an indication for enabling a selection of the device for wireless docking and cause the indication to facilitate the selection. A dock component may also be executed by the processor circuit to wirelessly dock to the mobile device based on selection of the device for wireless docking.

In some examples for the example third apparatus, the device may have one or more input/output devices accessible to the mobile device following wireless docking by the dock component. The indicator component may cause the device to provide the indication for enabling the selection via the one or more input/output devices emitting a visual indication to facilitate selection of the device for wireless docking.

According to some examples for the example third apparatus, the device may have at least one input/out device accessible to the mobile device following wireless docking by the dock component. For these examples, the at least one input/out device may include a display, a keyboard, a mouse, a storage device, a network interface card connected to the internet or one or more audio speakers.

In some examples for the example third apparatus, the device may be capable of operating in compliance with at least one or more wireless communication standards associated with the IEEE 802.11 standards to include IEEE 802.11ad. For these examples, the given frequency band may be a 60 GHz frequency band.

In some examples, example second methods implemented at a device capable of wirelessly docking to a mobile device utilizing a given frequency band may include receiving a request from the mobile device for identification information. The example second methods may also include transmitting identification information for the device. The example second methods may also include receiving one or more probe request messages from the mobile device via the given frequency band. The example second methods may also include transmitting, via the given frequency band, one or more separate probe responses to each of the one or more probe requests. The one or more separate probe responses may include information for the mobile device to gauge a distance between the device and the mobile device.

According to some examples, the example second methods may also include receiving an indicator request message to provide an indication for enabling a selection of the device for wireless docking. The example second methods may also include providing the indication for enabling the selection and wirelessly docking to the mobile device based on selection of the device for wireless docking.

In some examples for the example second methods, the device may have one or more input/output devices accessible to the mobile device following wireless docking. For these examples, the device may provide the indication for enabling the selection via the one or more input/output devices causing a visual indication to facilitate selection of the device for wireless docking.

According to some examples for the example second methods, the visual indication may include one of a glowing or pulsing light emitting device associated with the one or more input/output devices or a graphic on a display associated with the one or more input/output devices.

In some examples for the example second methods, the device may have at least one input/out device accessible to the mobile device following wireless docking. The at least one input/out device may include a display, a keyboard, a mouse, a storage device, a network interface card connected to the internet or one or more audio speakers.

According to some examples for the example second methods, the device may be capable of operating in compliance with at least one or more wireless communication standards associated with the IEEE 802.11 standards to include IEEE 802.11ad. For these examples, the given frequency band may be a 60 GHz frequency band.

In some examples for the example second methods, the identification information for the device may include a MAC address.

In some examples, a second at least one machine readable medium may include a plurality of instructions that in response to be being executed on a system for a device capable of wirelessly docking to a mobile device via a given frequency band may cause the system to receive a request from the mobile device for identification information. The plurality of instructions may also cause the system to transmit identification information for the device. The plurality of instructions may also cause the system to receive one or more probe request messages from the mobile device via the given frequency band. The plurality of instructions may also cause the system to transmit, via the given frequency band, one or more separate probe responses to each of the one or more probe requests. The one or more separate probe responses to include information for the mobile device to gauge a distance between the device and the mobile device. The plurality of instructions may also cause the system to receive an indicator request message to provide an indication for enabling a selection of the device for wireless docking. The plurality of instructions may also cause the system to provide the indication for enabling the selection and wirelessly dock to the mobile device based on selection of the device for wireless docking.

According to some examples for the second at least one machine readable medium, the device may have at least one input/out device accessible to the mobile device following wireless docking. For these examples, the at least one input/out device to include a display, a keyboard, a mouse, a storage device, a network interface card connected to the internet or one or more audio speakers.

In some examples for the second at least one machine readable medium, the device may be configured to operate in compliance with at least one or more wireless communication standards associated with the IEEE 802.11 standards to include IEEE 802.11ad. For these examples, the given frequency band may be a 60 GHz frequency band.

According to some examples for the second at least one machine readable medium, the identification information for the device may include a MAC address.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What is claimed is:

1. An apparatus comprising:
  a processor circuit for a mobile device;
  a receive component to be executed by the processor circuit to receive an indication to identify a given device to wirelessly dock via a given frequency band to the mobile device;
  a gather component to be executed by the processor circuit to gather identification information from one or more devices capable of wirelessly docking to the mobile device;
  a range component to be executed by the processor circuit to indicate distances between the mobile device and the one or more devices based on a ranging technique utilizing the given frequency band;
  an identify component to be executed by the processor circuit to identify the given device from among the one or more devices based on the given device having a shortest indicated distance;
  an indicator component to be executed by the processor circuit to send an indicator request message to cause the given device to provide an indication for enabling a selection of the given device for wireless docking; and
  a docking component to be executed by the processor circuit to wirelesly dock to the given device based on receiving confirmation of selection of the given device for wireless docking.

2. The apparatus of claim 1, comprising:
  a movement component to be executed by the processor circuit to detect whether the mobile device has become stationary for a period of time, the identify component to indicate the shortest distance to identify the given device following the movement component's determination that the mobile device has become stationary for the period of time.

3. The apparatus of claim 2, comprising the movement component using an accelerometer located with the mobile device to detect whether the mobile device has become stationary for the period of time.

4. The apparatus of claim 1, the ranging technique utilizing the given frequency band comprises the range component capable of transmitting one or more probe request messages to the one or more devices via the given frequency band and capable of receiving one or more separate probe responses that include information to determine the distances between the mobile device and the one or more devices.

5. The apparatus of claim 4, comprising the information received in the one or more separate probe responses used by the range component to separately determine a round trip time ($T_{RTT}$) based on signal delay across an air gap between an antenna for the mobile device and an antenna for each device from among the one or more devices ($T_{PROP}$) and on a respective processing delay for each device to process a received probe request ($T_{DELAY}$), where the round trip time may be determined by $T_{RTT}=2*T_{PROP}+T_{DELAY}$.

6. The apparatus of claim 5, comprising based on a respective separately determined $T_{RTT}$ by the range component for each of the one or more devices, the range component separately indicating a respective distance between the mobile device and each of the one or more devices.

7. The apparatus of claim 1, comprising the one or more devices having at least one input/out device accessible to the mobile device following wireless docking, the at least one input/out device to include a display, a keyboard, a mouse, a storage device, a network interface card connected to the internet or one or more audio speakers.

8. The apparatus of claim 1, comprising the mobile device and the one or more devices capable of operating in compliance with at least one or more wireless communication standards associated with the Institute of Electrical and Electronic Engineers (IEEE) 802.11 standards to include IEEE 802.11ad and the given frequency band comprising a 60 gigahertz (GHz) frequency band.

9. The apparatus of claim 1, the gather component to gather identification information comprising the gather component to receive separate media access control (MAC) addresses for each of the one or more devices, the separate MAC addresses sent by the one or more devices in response to a request message caused by the gather component to be transmitted from the mobile device that requested the separate MAC addresses.

10. The apparatus of claim 1, the indication to identify the given device received based on the mobile device coming within range of the given frequency band for the one or more devices or a user of the mobile device providing the indication.

11. A method comprising:
  receiving, at a mobile device, an indication to identify a given device to wirelessly dock via a given frequency band;
  indicating distances between the mobile device and one or more devices capable of wirelessly docking to the mobile device based on a ranging technique utilizing the given frequency band;
  identifying the given device from among the one or more devices based on the given device having a shortest indicated distance;
  sending an indicator request message to cause the given device to provide an indication for enabling a selection of the given device for wireless docking; and
  wirelessly docking to the given device based on receiving confirmation of selection of the given device for wireless docking.

12. The method of claim 11, comprising the given device having one or more input/output devices accessible to the mobile device following wireless docking, the device or the one or more input/output devices to provide a visual indication for the selection of the given device for wireless docking.

13. The method of claim 12, the visual indication to include one of a glowing or pulsing light emitting device associated with the one or more input/output devices or a graphic on a display associated with the one or more input/output devices.

14. The method of claim 11, comprising the shortest indicated distance indicated following detection that the mobile device has become stationary for a period of time.

15. The method of claim 14, comprising the detection based on the mobile device using an accelerometer to detect whether the mobile device has become stationary for the period of time.

16. The method of claim 14, comprising the detection based on comparing at least two distance determinations between the mobile device and the given device and detect whether the mobile device has become stationary for the period of time based on the at least two distance determinations indicating substantially the same distance over the period of time.

17. The method of claim 11, the ranging technique utilizing the given frequency band comprising:
  transmitting one or more probe request messages to the one or more devices via the given frequency band; and
  receiving one or more separate probe responses that include information to indicate the distances between the mobile device and the one or more devices.

18. The method of claim 17, comprising the information received in the one or more separate probe responses used to separately determine a round trip time ($T_{RTT}$) based on signal delay across an air gap between an antenna for the mobile device and an antenna for each device from among the one or more devices ($T_{PROP}$) and on a respective processing delay for each device to process a received probe request ($T_{DELAY}$), where the round trip time may be determined by $T_{RTT}=2*T_{PROP}+T_{DELAY}$.

19. The method of claim 18, comprising based on a respective separately determined $T_{RTT}$ for each of the one or more devices, separately indicating a respective distance between the mobile device and each of the one or more devices.

20. The method of claim 11, comprising the mobile device and the one or more devices capable of operating in compliance with at least one or more wireless communication standards associated with the Institute of Electrical and Electronic Engineers (IEEE) 802.11 standards to include IEEE 802.11ad and the given frequency band comprising a 60 gigahertz (GHz) frequency band.

21. An apparatus comprising:
  a processor circuit for a device capable of wirelessly docking to a mobile device via a given frequency band;
  an identity component to be executed by the processor circuit to receive a request from the mobile device for identification information and to cause the device to transmit identification information for the device;
  a probe component to be executed by the processor circuit to receive one or more probe request messages from the mobile device via the given frequency band and to cause the device to transmit, via the given frequency band, one or more separate probe responses to each of the one or more probe requests, the one or more separate probe responses to include information for the mobile device to gauge a distance between the device and the mobile device;
  an indicator component to be executed by the processor circuit to receive an indicator request message to provide an indication for enabling a selection of the device for wireless docking and cause the indication to facilitate the selection; and
  a dock component to be executed by the processor circuit to wirelessly dock to the mobile device based on selection of the device for wireless docking.

22. The apparatus of claim 21, comprising the device having one or more input/output devices accessible to the mobile device following wireless docking by the dock component, the indicator component to cause the device to provide the indication for enabling the selection via the one or more input/output devices emitting a visual indication to facilitate selection of the device for wireless docking.

23. The apparatus of claim 21, comprising the device having at least one input/out device accessible to the mobile device following wireless docking by the dock component, the at least one input/out device to include a display, a keyboard, a mouse, a storage device, a network interface card connected to the internet or one or more audio speakers.

24. The apparatus of claim 21, comprising the device capable of operating in compliance with at least one or more wireless communication standards associated with the Institute of Electrical and Electronic Engineers (IEEE) 802.11 standards to include IEEE 802.11ad and the given frequency band comprising a 60 gigahertz (GHz) frequency band.

25. At least one non-transitory machine readable medium comprising a plurality of instructions that in response to being executed on a system for a device capable of wirelessly docking to a mobile device via a given frequency band cause the system to:
  receive a request from the mobile device for identification information;
  transmit identification information for the device;
  receive one or more probe request messages from the mobile device via the given frequency band;
  transmit, via the given frequency band, one or more separate probe responses to each of the one or more probe requests, the one or more separate probe responses to include information for the mobile device to gauge a distance between the device and the mobile device;
  receive an indicator request message to provide an indication for enabling a selection of the device for wireless docking;
  provide the indication for enabling the selection; and
  wirelessly dock to the mobile device based on selection of the device for wireless docking.

26. The at least one non-transitory machine readable medium of claim 25, comprising the device configured to operate in compliance with at least one or more wireless communication standards associated with the Institute of Electrical and Electronic Engineers (IEEE) 802.11 standards to include IEEE 802.11ad and the given frequency band comprising a 60 gigahertz (GHz) frequency band.

27. The at least one non-transitory machine readable medium of claim 26, comprising the identification information for the device including a media access control (MAC) address.

\* \* \* \* \*